United States Patent
Davis et al.

(10) Patent No.: US 12,486,569 B2
(45) Date of Patent: Dec. 2, 2025

(54) INFILTRATED CARBON NANOTUBES

(71) Applicant: Brigham Young University, Provo, UT (US)

(72) Inventors: Robert Davis, Provo, UT (US); Richard Vanfleet, Provo, UT (US); Kyle Zufelt, Middleton, ID (US); David Jensen, Provo, UT (US)

(73) Assignee: TULA HEALTH, INC., Kaysville, UT (US)

( * ) Notice: Subject to any disclaimer, the term of this patent is extended or adjusted under 35 U.S.C. 154(b) by 0 days.

(21) Appl. No.: 18/456,163

(22) Filed: Aug. 25, 2023

(65) Prior Publication Data

US 2023/0407462 A1    Dec. 21, 2023

Related U.S. Application Data

(63) Continuation-in-part of application No. 16/854,534, filed on Apr. 21, 2020, now Pat. No. 11,885,011, (Continued)

(51) Int. Cl.
*B32B 9/00* (2006.01)
*C01B 32/158* (2017.01)
(Continued)

(52) U.S. Cl.
CPC .......... *C23C 16/045* (2013.01); *C01B 32/158* (2017.08); *C01B 32/16* (2017.08);
(Continued)

(58) Field of Classification Search
CPC ..... Y10T 428/30; B82Y 30/00; C23C 16/045; C23C 16/26
(Continued)

(56) References Cited

U.S. PATENT DOCUMENTS

| | | |
|---|---|---|
| 4,163,900 A | 8/1979 | Warren et al. |
| 4,250,127 A | 2/1981 | Warren et al. |

(Continued)

FOREIGN PATENT DOCUMENTS

| | | |
|---|---|---|
| WO | 2000/28892 | 5/2000 |
| WO | 2012/063229 | 5/2012 |
| WO | 2017/165532 | 2/2017 |

OTHER PUBLICATIONS

Wood et al., "Strength and Mechanical Properties of Carbon Nanotube Templated Materials," Bulletin of the American Physical Society: Fall 2009 Meeting of the Four Corners Section of the APS, vol. 54, No. 14 (Oct. 24, 2009).

(Continued)

*Primary Examiner* — Daniel H Miller
(74) *Attorney, Agent, or Firm* — RAY QUINNEY & NEBEKER; Thomas L. Lingard

(57) ABSTRACT

Described herein are examples of systems, methods, apparatuses, and devices which include a carbon nanotube structure. The carbon nanotube structure may include a first carbon nanotube with a first top surface and a first bottom surface. The carbon nanotube structure may include a second carbon nanotube vertically aligned with the first carbon nanotube. The second carbon nanotube may include a second top surface and a second bottom surface. The first carbon nanotube and the second carbon nanotube may be infiltrated with carbon by a mixture that is flowing. The mixture may include a first amount of ethylene and a second amount of hydrogen. The carbon nanotube structure may include a thin film extending along the first bottom surface and the second bottom surface.

13 Claims, 5 Drawing Sheets

Related U.S. Application Data which is a continuation of application No. 13/924,154, filed on Jun. 21, 2013, now abandoned.

(60) Provisional application No. 61/690,222, filed on Jun. 21, 2012.

(51) Int. Cl.

| | | |
|---|---|---|
| *C01B 32/16* | (2017.01) | |
| *C01B 32/168* | (2017.01) | |
| *C01B 32/178* | (2017.01) | |
| *C23C 16/01* | (2006.01) | |
| *C23C 16/04* | (2006.01) | |
| *C23C 16/26* | (2006.01) | |
| *B82Y 30/00* | (2011.01) | |

(52) U.S. Cl.
CPC .......... *C01B 32/168* (2017.08); *C01B 32/178* (2017.08); *C23C 16/01* (2013.01); *C23C 16/26* (2013.01); *B82Y 30/00* (2013.01); *Y10T 428/30* (2015.01)

(58) Field of Classification Search
USPC ........................................................ 428/408
See application file for complete search history.

(56) References Cited

U.S. PATENT DOCUMENTS

| | | | |
|---|---|---|---|
| 5,494,043 A | 2/1996 | O'Sullivan et al. | |
| 5,642,733 A | 7/1997 | Archibald et al. | |
| 5,853,485 A | 12/1998 | Rudolph et al. | |
| 6,132,383 A | 10/2000 | Chesney et al. | |
| 6,331,209 B1 | 12/2001 | Jang et al. | |
| 6,932,772 B2 | 8/2005 | Kan | |
| 7,022,541 B1* | 4/2006 | Yenilmez | G01Q 70/12 |
| | | | 438/782 |
| 9,554,724 B2 | 1/2017 | Schuessler | |
| 9,603,569 B2 | 3/2017 | Mirov et al. | |
| 9,826,907 B2 | 11/2017 | Magi | |
| 2004/0192072 A1 | 9/2004 | Snow et al. | |
| 2007/0249916 A1 | 10/2007 | Pesach et al. | |
| 2007/0259128 A1 | 11/2007 | Parsapour | |
| 2010/0173228 A1 | 7/2010 | Wallace et al. | |
| 2012/0302117 A1 | 11/2012 | Forest et al. | |
| 2013/0112610 A1 | 5/2013 | Davis et al. | |
| 2014/0015548 A1* | 1/2014 | Naughton | G01R 27/26 |
| | | | 29/829 |
| 2014/0094675 A1 | 4/2014 | Luna et al. | |
| 2014/0128753 A1 | 5/2014 | Luna et al. | |
| 2015/0031354 A1 | 1/2015 | Nuss et al. | |
| 2015/0297145 A1 | 10/2015 | Luna et al. | |
| 2015/0374245 A1 | 12/2015 | Szilagyi | |
| 2016/0361029 A1 | 12/2016 | Kang et al. | |

OTHER PUBLICATIONS

Fazio et al., "Material Properties of Carbon-Infiltrated Carbon Nanotube-Templated Structures for Microfabrication of Compliant Mechanisms," Conference Proceedings: ASME 2011 International Mechanical Engineering Congress and Exposition, vol. 11 (Nov. 2011).
Hutchison et al., "Carbon Nanotubes as a Framework for High-Aspect-Ration MEMS Fabrication", Journal of Microelectromechanical Systems, vol. 19, No. 1, (Feb. 2010), pp. 75-82.
Wang et al., "Stress Relief Patterns of Hydrogenated Amorphous Carbon Films Grown by DC-Pulse Plasma Chemical Vapor Deposition", Applied Surface Science, vol. 255, (2008), pp. 1836-1840.
Wei et al, "You are how you sleep: personalized sleep monitoring based on wrist temperature and accelerometer data." DOI 10.4108/eai.20-5-2019.2282879.
Böttcher et al., Growth of Novel Carbon Phases by Methane Infiltration of Free-Standing Single-Walled Carbon Nanotube Films, Carbon, vol. 45, (2007), pp. 1085-1096.
U.S. Appl. No. 16/854,534, Jun. 17, 2021, Office Action.
U.S. Appl. No. 16/854,534, Dec. 13, 2021, Office Action.
U.S. Appl. No. 16/854,534, Mar. 31, 2022, Notice of Allowance.
U.S. Appl. No. 16/854,534, Jan. 10, 2024, Issue Notification.
U.S. Appl. No. 13/924,154, Jul. 8, 2015, Office Action.
U.S. Appl. No. 13/924,154, Feb. 11, 2016, Office Action.
U.S. Appl. No. 13/924,154, Sep. 13, 2016, Office Action.
U.S. Appl. No. 13/924,154, Mar. 16, 2017, Office Action.
U.S. Appl. No. 13/924,154, Oct. 6, 2017, Office Action.
U.S. Appl. No. 13/924,154, Apr. 6, 2018, Office Action.
U.S. Appl. No. 13/924,154, Sep. 25, 2020, Office Action.
U.S. Appl. No. 13/924,154, Apr. 30, 2021, Office Action.
U.S. Appl. No. 13/924,154, Dec. 21, 2021, Office Action.
U.S. Appl. No. 13/924,154, Jun. 7, 2022, Office Action.
U.S. Appl. No. 13/924,154, Oct. 20, 2022, Office Action.
U.S. Appl. No. 13/924,154, Appeal Decision, mailed Mar. 20, 2020.
U.S. Appl. No. 13/924,154, Examiner's Answer, mailed Mar. 1, 2019.

* cited by examiner

INFILTRATED CARBON NANOTUBES

CROSS-REFERENCE TO RELATED APPLICATIONS

This application is a continuation-in-part of U.S. application Ser. No. 16/854,534, filed Apr. 21, 2020 which is a continuation of U.S. application Ser. No. 13/924,154, filed Jun. 21, 2013 and claims the benefit of U.S. Provisional Application Ser. No. 61/690,222 filed on Jun. 21, 2012, the entire contents of which are incorporated by this reference.

BACKGROUND

Carbon nanotubes are allotropes of carbon with a cylindrical nanostructure. These materials generally are "grown", via chemical deposition of carbon, upon a substrate (such as, for example, a silicon substrate). Once created on a substrate, the carbon nanotubes are often referred to as a "carbon nanotube forest."

After producing a carbon nanotube forest, researchers have attempted to "infiltrate" or add various additional chemicals/elements to the carbon nanotube forest. However, if a researcher attempts to add additional quantities of carbon to the carbon nanotube forest (via a chemical deposition process involving ethylene within a heated furnace), the infiltrated carbon nanotubes will generally delaminate (separate) from the substrate upon cooling.

Additionally, researchers have also been examining new possible materials that may be used as "grids" for a transmission electron microscopy (TEM). A material may be added to a TEM grid and then analyzed using the TEM.

Samples that are prepared for observation and characterization in a TEM must be electron transparent but still be able to be handled and manipulated. Significant efforts are spent preparing specimens, thinning, or devising support mechanisms for specimens in order for TEM to be used. One common method in TEM is the use of metal grids with thin support films bridging the grid gaps. Samples are then deposited on the thin support film for TEM observation. Many varieties of grid materials are available but the most common is copper. Subsequent analysis on the common grids by means of energy dispersive x-ray spectroscopy (EDXS) will be sensitive to the high-Z atoms used in the support grid (for example, the copper) and show unwanted and confusing counts from the support structure. This is especially problematic when analyzing samples that contain either the same elements as the support grid or that have overlap in the EDXS spectra with elements in the support grid.

Metal atoms are also undesirable for applications and sample preparations involving exposure to chemicals or biological agents, where metals can react with the sample or the materials used in preparing the sample. To address this problem, TEM grids from less reactive metals or low-Z elements are also available. However, grids of these materials (such as beryllium or diamond) can be both expensive and/or toxic.

Carbon is a low-Z atom which can be fabricated into three dimensional geometries. Previous attempts to incorporate carbon as a material in TEM grids include: casting carbon fibers in a polyester mold, and coating metals in a carbon nanotube. The former have limited chemical resistance, and the latter do not avoid the use of high-Z atoms. The two methods which currently exist for fabricating high-aspect ratio, all-carbon devices are: carbonization of an SU-8 photo-resist, and carbon nanotube templated microfabrication (CNT-M). The carbonization process for the SU-8 structures results in shrinkage of up to 80% of the original dimensions of a structure. This does not allow for accurate dimensional control, an important element in the construction of TEM grids which must fit into a 3.05 mm diameter slot in the TEM stage. CNT-M is a process whereby three-dimensional carbon nanotube structures can be grown from a patterned two-dimensional catalyst layer. However, this technique is also limited in its applications.

BRIEF DESCRIPTION OF THE DRAWINGS

The present description will be understood more fully when viewed in conjunction with the accompanying drawings of various examples of infiltrated carbon nanotubes. The description is not meant to limit the infiltrated carbon nanotubes to the specific examples. Rather, the specific examples depicted and described are provided for explanation and understanding of infiltrated carbon nanotubes. Throughout the description the drawings may be referred to as drawings, figures, and/or FIGs.

DETAILED DESCRIPTION

Figure 1:
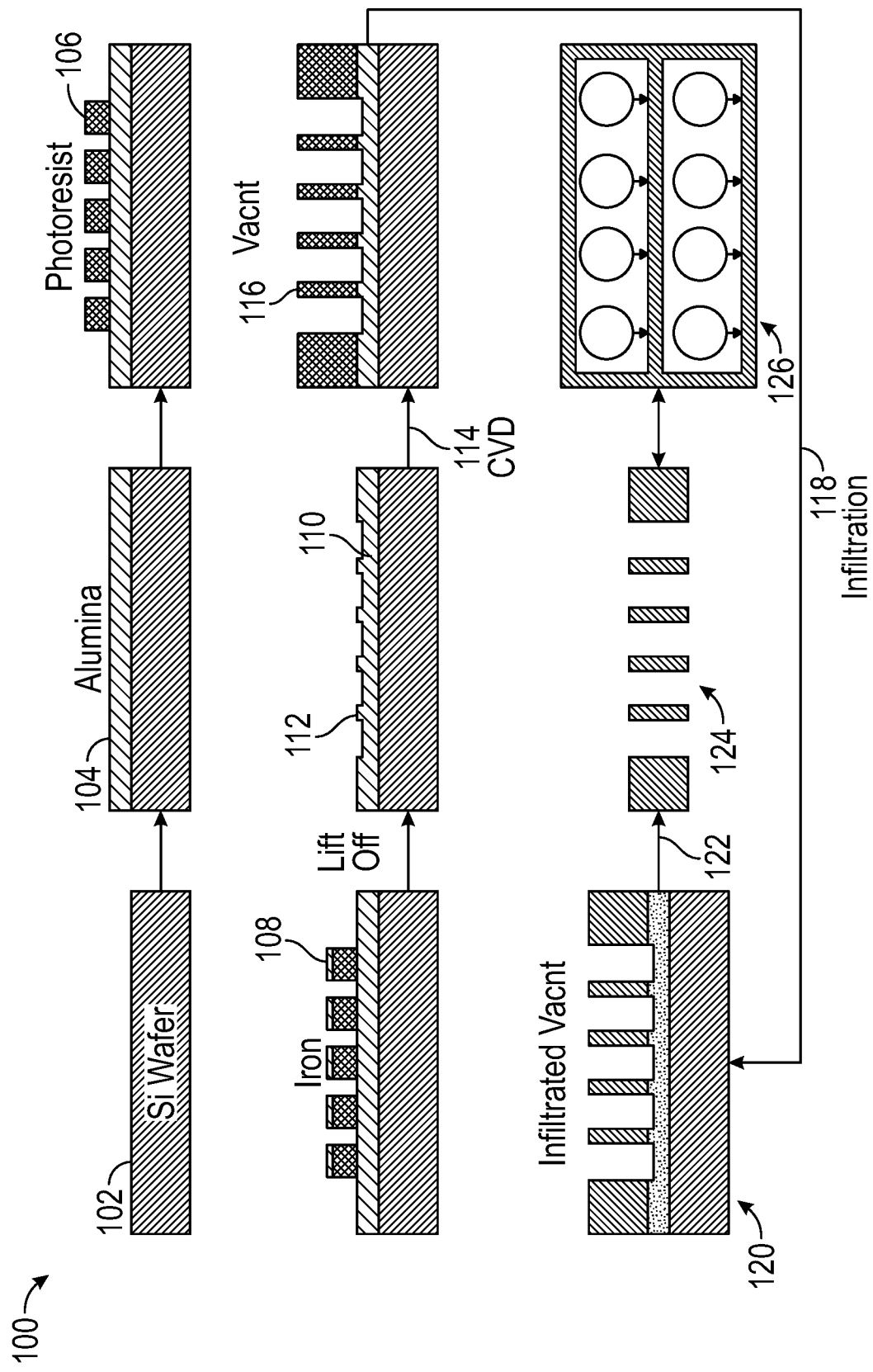
FIG. 1 shows a flow diagram of a process for growing and infiltrating carbon nanotubes via a chemical deposition process, according to an embodiment.

Infiltrated carbon nanotubes as disclosed herein will become better understood through a review of the following detailed description in conjunction with the figures. The detailed description and figures provide merely examples of the various embodiments of infiltrated carbon nanotubes. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

The present embodiments prevent the spontaneous delamination of highly infiltrated carbon nanotube films and structures. These embodiments reduce stress and prevent stress fracturing and cracking of carbon films (including thin films) that are infiltrated into the carbon nanotube structures. Reducing the stress during infiltration provides a higher strength film or structure. The present embodiments allow for the deposition of large area, thin, suspended films that would be destroyed by other methods.

The process outlined herein may create a 3-Dimensional structure by using carbon nanotube forest growth to convert a two-dimensional lithographically formed pattern of catalyst into the third vertical dimension. Infiltration of the 3-D forest pattern with another material (such as carbon) creates the 3-D solid (or porous) structure.

Carbon nanotubes (also referred to herein as "CNT") may be synthesized as follows. This process may involve thermal chemical vapor deposition ("CVD"), where carbon nanotubes may be grown on prepared silicon wafers by the decomposition of a carbon-containing gas (such as ethylene). The prepared wafers may be patterned with 30 nm of $Al_2O_3$ and 7 nm of Fe using standard photolithography techniques and lift off. CNT growth and infiltration may be done in a 1" tube furnace. After a heating time of 10 minutes in hydrogen (200 sccm), CNT structures may be grown at 750 QC with ethylene (116 sccm) and hydrogen (400 sccm) gases. ("SCCM" refers to standard cubic centimeters per minute.) In some embodiments, the CNT forests may be cooled. In other embodiments, the CNT forests may be directly infiltrated with carbon at 900 QC in 100 sccm ethylene and 200 sccm argon or hydrogen. Flowing hydrogen during carbon infiltration leaves CNT structures attached to substrate, while flowing argon causes spontaneous release (delamination) upon cooling. Cooling may be done in 250 sccm argon for 15 minutes, at which time the furnace may be opened with argon continuing to flow through the sealed tube until the furnace temperature dropped to 300 QC. The tube may then be opened and the samples removed.

The infiltration process deposits carbon on the nanotubes and may lock them together to make a solid structure. This final structure can be porous or dense depending upon the degree and quality of the infiltration. The deposition also coats non-nanotube regions creating a "floor layer". Samples were etched in a 300 W oxygen plasma at 100 mTorr for 5 minutes to remove the floor layer.

If the infiltrated carbon nanotube structures are to be used for a transmission electron microscopy (TEM) grid, the following procedure may be used. Specifically, a lithography mask may be prepared where each 4" silicon wafer contained 250 individual TEM grids. The grids are attached together in sets of 8. Grid height was a function of CNT growth time, wherein 3 minutes of growth produces forests approximately 50 µm tall.

Accordingly, forming TEM grids with low-Z atoms (such as carbon) which have of controlled geometry which are chemically resistant and devoid of high-Z and metal atom contaminants. As described herein, the grids may be further coated with a thin film that comprises, for example, boron carbide, alumina, silicon dioxide, or carbon.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

FIG. 1 shows a flow diagram 100 of a process for growing and infiltrating carbon nanotubes via a chemical deposition process, according to an embodiment. Specifically, in this method, a carbon vapor deposition (CVD) procedure is used. First a substrate 102 is obtained. In the embodiment shown in FIG. 1, the substrate comprises a silicon wafer. Those skilled in the art will appreciate that other materials may be used as the substrate 102. The substrate 102 may then be coated with alumina, as shown by numeral 104. More specifically, the substrate 102 may be patterned with alumina (such as, for example, 30 nm of Al2O3). (Blanket layers of alumina, as shown in FIG. 1, can also be used.) Once coated, the substrate 102 may be subjected to a lithography procedure 106 for creating a patterned iron catalyst layer 108. In the embodiment shown in FIG. 1, 7 nm of Fe is applied. Those skilled in the art will appreciate that standard photolithography techniques and standard lift off 110 or other pattern transfer methods may be used. Once the lift off procedure 112 has occurred, the iron catalyst 108 is positioned on the wafer 102 in a position that will foster carbon nanotube growth in the desired pattern.

In some embodiments, the wafer 102 with the iron catalyst 108 may be made in the manner outlined above. In other embodiments, the wafer 102 in this form may be purchased or otherwise obtained. In order to grow carbon nanotubes on the wafer 102, a CVD process (as shown by arrow 114) is performed. Specifically, CNT growth occurs, for example, in a 1" tube furnace with a heating time of 10 minutes. Hydrogen gas is added at 200 sccm. To this mixture, ethylene is added. CNTs were grown at 750° C. with ethylene (116 sccm) and hydrogen (400 sccm) gases. (The temperature may range from 600 to 900° C. in other embodiments.) It should be noted that during this growth process, the hydrogen gas interacts with the Fe catalyst to promote CNT growth and operates to keep the catalyst active during the process. The CNTs grow at the catalyst sites. When the CNTs are grown, they have a density of about 1% carbon and are generally held in place by weak Van der Waals attraction. The CNTs are shown as structure 116 in FIG. 1. As shown in FIG. 1, the CNTs generally grow perpendicular to the catalyst sites.

Once the CNTs have been grown or otherwise obtained (such as, for example, via purchasing), it may be desirable (in some embodiments) to infiltrate these CNTs 116 with an additional amount of carbon or with an additional material. The infiltration process is shown as arrow 118 and is described below.

CNT forests 116 may be infiltrated 118 with carbon at 900° C. in 100 sccm ethylene and 200 sccm argon or hydrogen. (The temperature may range from 800 to 1100° C. in other embodiments. The time used for infiltrating may be between, for example, 1 minute and 24 hours and the total flow of hydrogen may be between 100 to 1000 sccm.) Flowing hydrogen during carbon infiltration leaves CNT structures 116 attached to substrate 102, while flowing argon (without hydrogen) causes spontaneous release (delaminate) upon cooling. The infiltrated structures 120 are then cooled and removed from the furnace. Cooling may be accomplished in 250 sccm argon for 15 minutes, at which time the furnace was opened with argon continuing to flow through the sealed tube until the furnace temperature dropped to 300° C. The tube may then be opened and the samples removed. As noted above, the use of hydrogen during the infiltration process can produce infiltrated CNT structures 120 that will not delaminate (separate) from the substrate upon cooling. Without being bound by theory, it is believed that the presence of the hydrogen during the infiltration process either reduces the stress or better adheres the infiltrated CNT structure to the substrate.

The infiltration process deposits carbon (or some other material) on the nanotubes. This process may also deposit the carbon/other material on the substrate. The infiltration process may lock the CNTs together to make a solid structure. This final structure can be porous or dense depending upon the degree and quality of the infiltration. The deposition may also coat non-nanotube regions creating a "floor layer". The infiltrated samples may then be etched 122 in a 300 W oxygen plasma at 100 mTorr for 5 minutes to remove the floor layer.

After the CNT structures 124 have been partially or substantially infiltrated, they may be used for a variety of different applications including MEMS (microelectromechanical systems) and other devices (such as sensors, actuators, microsieves, or microfilters) that utilize carbon-infiltrated carbon nanotube (CNT) structures. Partially infiltrated CNT structures 124 may then have additional processing steps performed on them possibly including the following: chemical vapor deposition, additional chemical vapor infiltration with another material, liquid based deposition including electrochemical deposition, liquid based infiltration including electrochemical infiltration, further patterning, and/or polishing. These processing steps may ultimately involve burning out the CNT and deposited carbon (in a high temperature oxygen containing environment) leaving only subsequently deposited inorganic layers. The infiltrated CNT structures may also be used as grids 126 for TEM measurements. In fact, the embodiment shown in FIG. 1 has been particularly designed such that the infiltrated CNT structures 126 may be used as a TEM grid. In this embodiment, a lithography mask is used. Each 4" silicon wafer contained 250 individual TEM grids 128. The grids 128 are attached together in sets of 8 as seen in FIG. 1.

Figure 2:
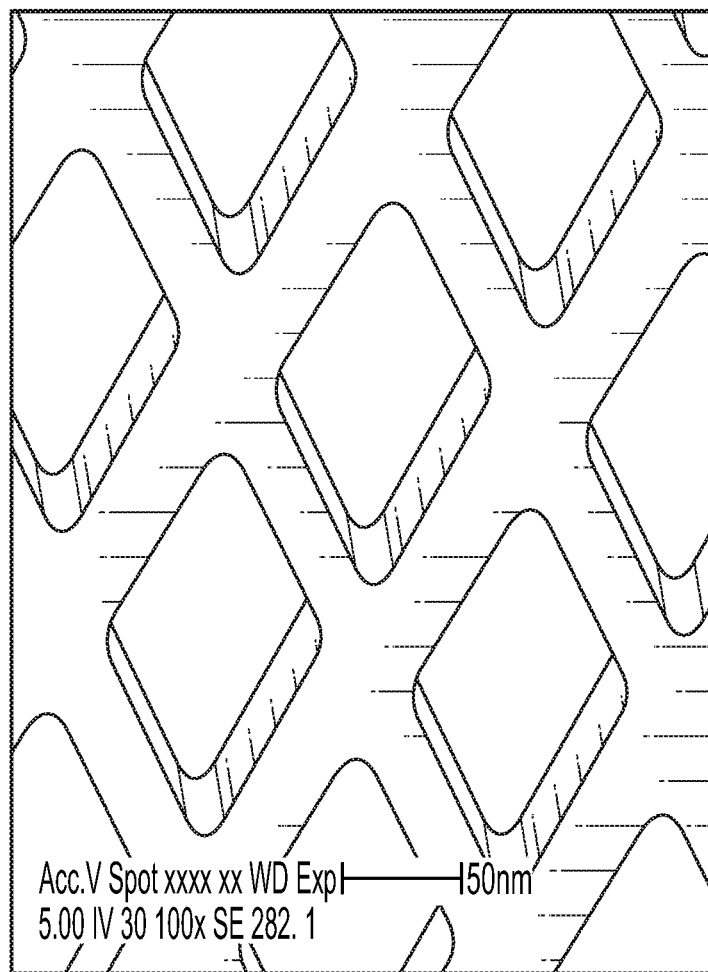
FIG. 2 shows a scanning electron microscopy (SEM) image of fabricated transmission electron microscopy (TEM) grids that are made of carbon nanotube structures that were infiltrated, according to an embodiment.

FIG. 2 shows a scanning electron microscopy (SEM) image of fabricated transmission electron microscopy (TEM) grids 200 that are made of carbon nanotube structures that were infiltrated, according to an embodiment. Grid height was a function of CNT growth time with 3 minutes of growth produced forests approximately 50 µm tall.

As noted above, the process described above for infiltrating CNT structures with carbon (using a flow of hydrogen) has value by itself. At the same time, the CNT structures made using this process may further be used to add a thin film to the CNTs. CNT structures with a thin film added thereto is useful for a variety of applications, including x-ray windows, MEMS microphones and pressure sensors, heaters, and other devices. Moreover, as described above, the addition of a thin film to CNT structures may be particularly appealing in the construction of TEM grids, as it may allow the grid to be made without copper, expensive diamond or beryllium, etc.

Figure 3:
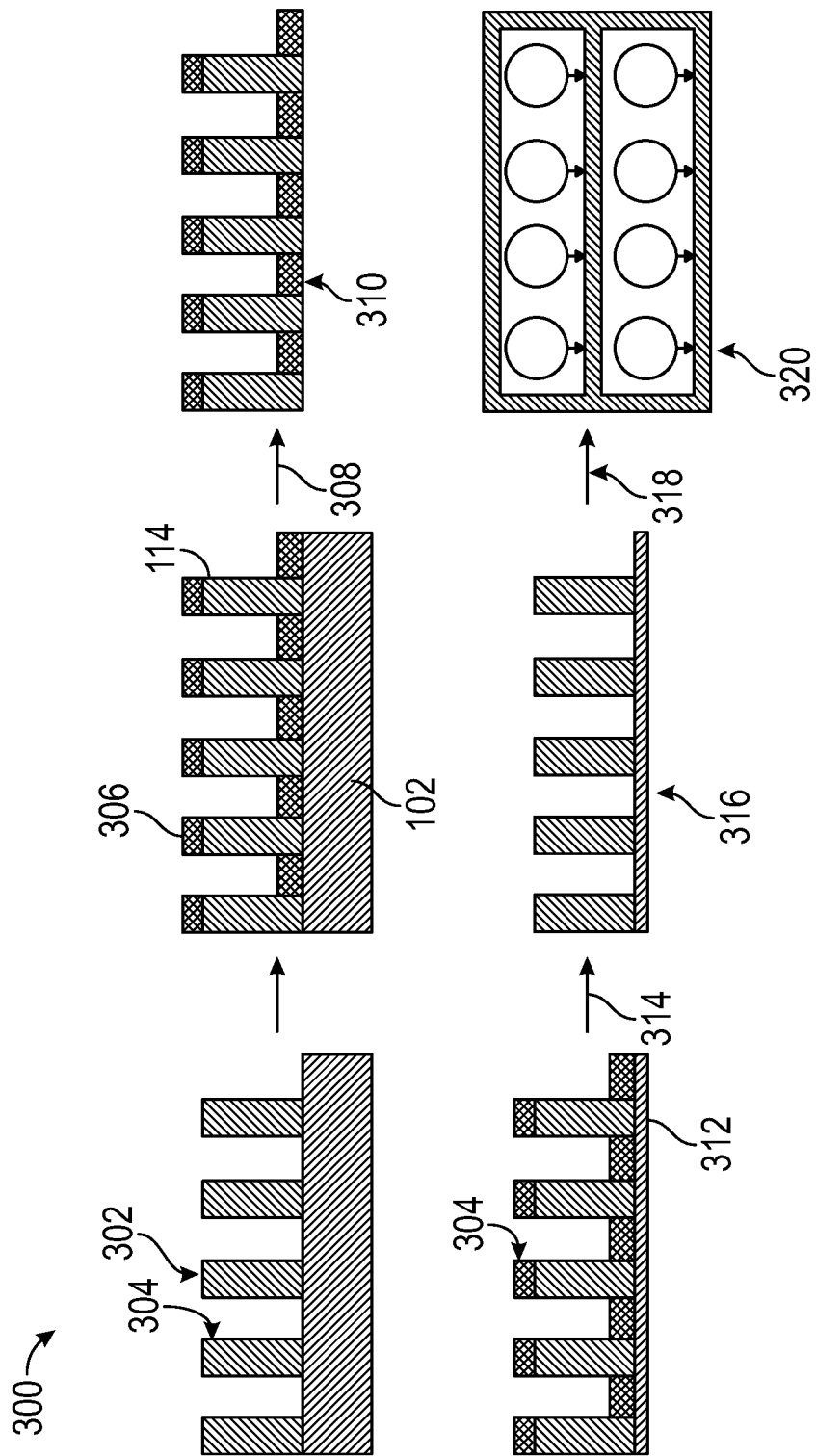
FIG. 3 shows a flow diagram of how a thin film may be attached to a carbon nanotube structure, according to an embodiment.

FIG. 3 shows a flow diagram 300 of how a thin film may be attached to a carbon nanotube structure, according to an embodiment. The process by which thin films may be added to the CNT structures and the gaps between regions may be shown in flow diagram 300. As shown in FIG. 3, a quantity of CNTs will be obtained 302. In some embodiments "obtaining" 302 the CNTs may involve constructing and/or infiltrating the CNTs using the processes outlined herein. In other embodiments, the "obtaining" of the CNTs may involve purchasing or otherwise acquiring these structures. Other structures on substrates with that surface being defined by the substrate surface may also be used.

Once the CNTs have been obtained, a protective layer 306 may be added. (This protective layer is a "sacrificial" layer.) This layer may be between 1-1000 microns in thickness. In some embodiments, the layer 306 may be made of Formvar (0.5% solution prepared in 1,2-Dichloroethane), or some other polymer. (Formvar is commercially available from many sources and is used in TEM grids. Formvar is generally made of formals of polyvinyl alcohol.) Various methods may be used to deposit the layer 306 including ultrasonic spraying, drip coating, spin coating, etc. The layer 306 is also added to the gaps 304 between the nanotubes 114.

In the embodiment shown in FIG. 3, the layer 306 is added while the CNT structures 114 are still attached to the flat silicon substrate 102. The protective layer 306 covers both the substrate 102 and the CNTs 114 (and any other exposed silicon surfaces). Once covered with the layer 306, the substrate 102 may be removed, as shown by arrow 308. Such removal of the substrate 310 may occur by placing the substrate 102 in HF (1-100% diluted in water) for 10 minutes and then rinsing with deionized water for 10 minutes.

A thin film 312 may then be directly deposited onto the substrate-defined side of Formvar coated structures. Those skilled in the art are familiar with the techniques needed to apply the film, given the present disclosure. The structures can then be thermally annealed in argon, or another inert gas, or immersed in a solvent to remove the polymer protective layer 306, as shown by arrow 314. The resulting structure 316 is a thin film 312 applied to the CNTs 114. The thin film 312 is suspended, as shown by FIG. 3. The thin film 312 is also applied to the gaps 304 that are between the nanotubes 114.

Another embodiment of the way 318 in which the thin film 312 may be attached to CNT structures will now be described. This process allows direct application of the film to many grid 320 supports or other CNT structures at the same time. In this process, a thick sacrificial layer is deposited on the structures while they are still attached to the flat silicon substrate. This covers both the grids 320 and within the grid holes. Removal of the grids and sacrificial layer gives a flat surface on the wafer side of the structure. Deposition of the thin membrane is on that flat surface. The sacrificial layer is then removed.

The sacrificial layer is a 0.5% solution of Formvar powder prepared in 1,2-Dichloroethane. Formvar was sprayed onto TEM grids, still attached to the silicon substrate, by an ultrasonic sprayer. Samples were placed in 49% HF for 10 minutes, rinsed in DI (deionized) water for 10 minutes, and removed from substrate. Thin films were then directly deposited onto the substrate-defined side of Formvar coated grids.

Chemical testing was performed by placing grids in KOH, HCl, or HF solutions for several hours. Grids were then rinsed in deionized water for 10 minutes. TEM characterization, along with collection of EDXS and EELS (Electron Energy Loss Spectroscopy) data, were done in a Tecnai F20 TEM.

Figure 4A:
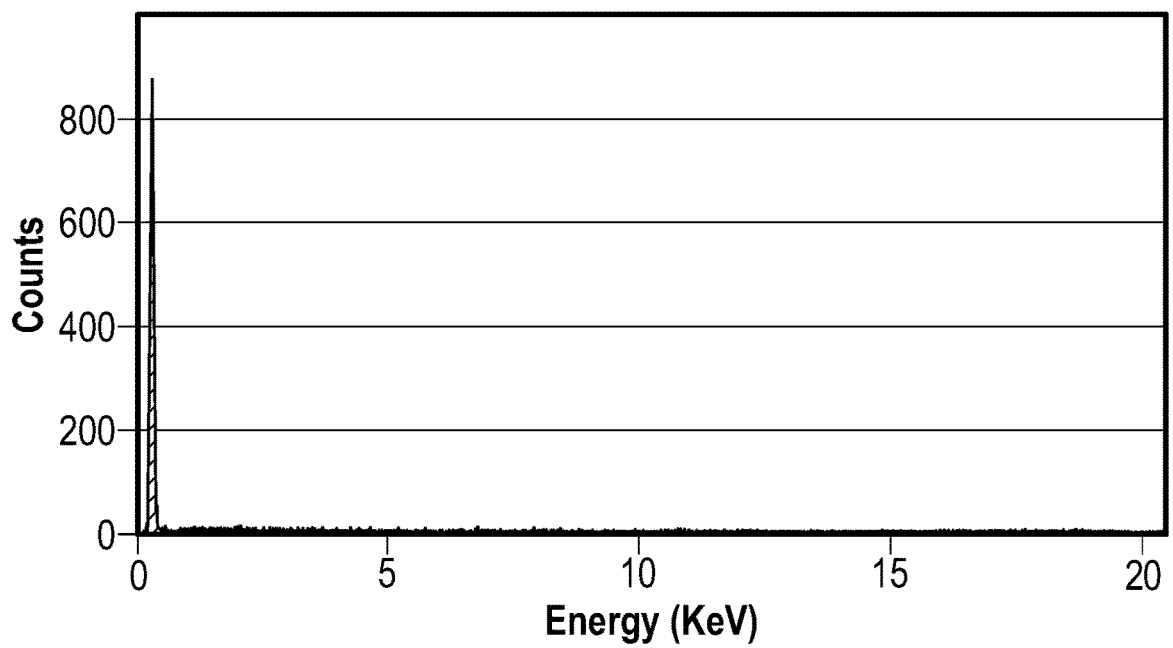
FIG. 4A is a graph shown 100s of XRD (X-ray diffraction) data collected from all-carbon TEM grid made according to the present embodiments (top), and a commercial copper grid (bottom), according to an embodiment.
Figure 4B:
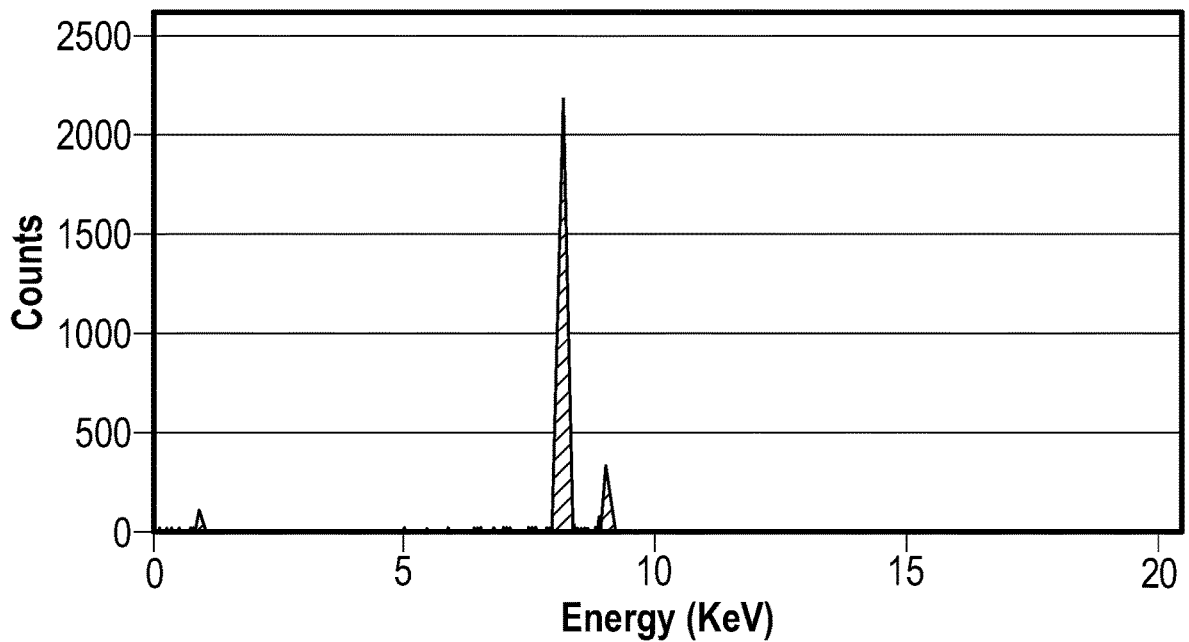
FIG. 4B is a graph shown 100s of XRD (X-ray diffraction) data collected from all-carbon TEM grid made according to the present embodiments (top), and a commercial copper grid (bottom), according to an embodiment.

FIG. 4A is a graph 400 shown 100s of XRD (X-ray diffraction) data collected from all-carbon TEM grid made according to the present embodiments (top), and a commercial copper grid (bottom), according to an embodiment. FIG. 4B is another graph 402 shown 100s of XRD (X-ray diffraction) data collected from all-carbon TEM grid made according to the present embodiments (top), and a commercial copper grid (bottom), according to an embodiment.

Thin films were deposited on glass slides and thickness confirmed by characterization on a Veeco Dimension 5 AFM. EDXS analysis of grids showed carbon peaks with no other atomic signatures. This indicated the absence of the Fe growth catalyst and Al2O3 diffusion barrier used during the growth process. Chemically tested grids showed no measurable deformation or change in mechanical properties of the grid. EDXS detected no non-carbon signature after chemical tests.

Force testing has been conducted to determine the materials properties of CNT-M structures. (See e.g., Fazio, W et al. "Material Properties of Carbon-Infiltrated Carbon Nanotube-Templated Structures for Microfabrication of Compliant Mechanisms," ASME Proc., 2011.) This testing has confirmed a yield tensile strength of 110 MPa and a Young's modulus of 6 GPa. Bulk copper is known to have a yield tensile strength of 70 MPa and a Young's modulus of 117 GPa.

It should be noted that carbon grids, of the type made according to the present embodiments, may be more resistant to bending than metal grids. However, carbon grids may break under the same applied force that would cause metal grids to bend or crease. Carbon grids may be more chemically resistant than metal grids and may contain no detectable high-z atoms. The microfabrication process used to make the grids may allow reliable control over the dimensions of the grid. The microfabrication process also may allow control over the number of grids that are locked together during growth and processing. Further, the thin film deposition method outlined herein requires very little handling and allows for processing large batches of grids. This method has been successfully shown to produce thin, suspended films with thicknesses from 10-25 nm. This method may be preferable to the current method for depositing thin films on TEM grids, as it is scalable and poses less risk of damaging grids due to handling.

The present embodiments may also allow for construction of TEM grids that are composed entirely of carbon. These grids are more resistant to bending than commercially available grids, have a greater tensile strength, and can be made and processed in batches. As outlined herein, such grids may be coated (with a thin film) that is made of amorphous carbon, alumina, silicon dioxide, and/or boron carbide thin films. Obviously, applying different materials as the films for TEM grids will result in different surface chemistry and may result in better TEM measurements (depending upon the particular sample, etc.).

The present embodiments relate to a variety of different methods. For example, a method of adding a thin film to carbon nanotubes is disclosed. This method comprises obtaining a quantity of carbon nanotubes attached to a substrate and then coating the carbon nanotubes with a protective layer. In some embodiments, the protective layer may be Formvar or another polymer. The substrate may be coated with the protective layer in addition to the coating of the carbon nanotubes. The substrate may then be removed from the coated carbon nanotubes. A thin film may then be deposited on the coated carbon nanotubes. In some embodiments, the thin film is selected from the group consisting of amorphous carbon, silicon dioxide, alumina and boron carbide. Once the thin film is added, the protective layer may be removed, thereby resulting in a thin film that is suspended on the carbon nanotubes. In some embodiments, the protective layer may be removed by thermal annealing in an argon atmosphere. In other embodiments, the protective layer may be removed by immersion in a solvent. In some embodiments, the carbon nanotubes that include the thin film are used as a Transmission Electron Microscope grid.

Another method is a method for infiltrating carbon (or another material) onto carbon nanotubes. This method involves obtaining carbon nanotubes on a substrate. In some embodiments, this obtaining may involve forming the carbon nanotubes and/or purchasing the carbon nanotubes. Once the nanotubes are obtained, the carbon nanotubes may be heated with ethylene gas and hydrogen gas within a furnace. This heating may occur, for example, to a temperature of about 900° C. (or more generally, between 800 to 1100° C.). When the nanotubes are heated with ethylene and hydrogen, the carbon nanotubes do not delaminate from the substrate when they are removed from the furnace. If hydrogen is omitted from this heating step (e.g., the heating during the infiltration process), the nanotubes will delaminate from the substrate upon cooling. Thus, by adding hydrogen to the infiltration step, significant advantages may be obtained. As noted above, the obtaining of the carbon nanotubes may involve forming the nanotubes. Such forming of the nanotubes involves obtaining a substrate comprising silicon and then forming the carbon nanotubes by a first deposition of vaporized carbon onto the substrate using a catalyst, wherein hydrogen gas is present during the depositing, and then cooling the carbon nanotubes.

It should be noted that some of the present embodiments have been directed carbon nanotube structures that have gaps, and more particularly, to ways in which a thin film may be "suspended" across the gaps and added to the carbon nanotube structure. This disclosure involving carbon nanotubes is not limiting. Other structures having gaps may be used instead of carbon nanotubes and those disclosures regarding coating the structure having gaps with a protective layer, removing the substrate, adding the thin film to the structure (and the gaps) with the thin film and then removing the protective layer apply equally to carbon nanotube structures and to other structures that also have gap (that may not be carbon nanotube structures).

Figure 5:
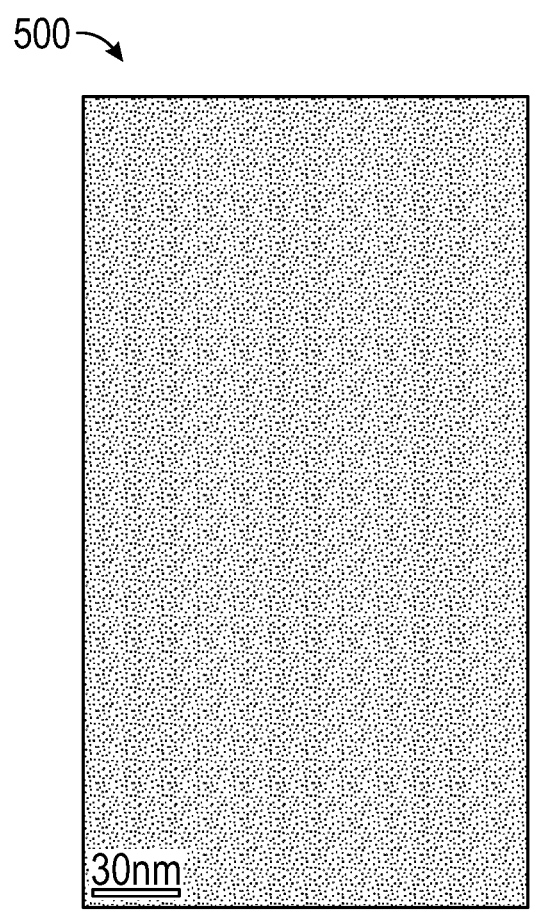
FIG. 5 shows an HRTEM (High Resolution Transmission Electron Microscope) image of a 25 nm thick boron carbide film deposited, according to an embodiment.

FIG. 5 shows an HRTEM (High Resolution Transmission Electron Microscope) image 500 of a 25 nm thick boron carbide film deposited), according to an embodiment. The image 500 may show a lack of crystalline structure and was taken at 200 keV.

Carbon films were sputtered in a Kurt Lesker PVD-75 system. Silicon dioxide and aluminum oxide films were deposited by a Denton E-Beam Evaporator. Boron Carbide films were deposited by magnetron sputtering. TEM analysis of thin films shows amorphous structures with good electron transmission (see FIG. 5). Grids were annealed in argon at 400° C. for 15 minutes to remove the sacrificial layer.

All of the articles and patents cited herein are expressly incorporated herein by reference.

All of the compositions and/or methods and/or processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. An apparatus, comprising:
   a first carbon nanotube, comprising:
      a first top surface; and
      a first bottom surface;

a second carbon nanotube vertically aligned with the first carbon nanotube, the second carbon nanotube comprising:
- a second top surface; and
- a second bottom surface, wherein the first carbon nanotube and the second carbon nanotube are infiltrated with carbon by a mixture that is flowing and having a temperature between 800 and 950 degrees Celsius, the mixture comprising:
  - a first amount of ethylene between 150 standard cubic centimeter per minute (sccm) and 200 sccm; and
  - a second amount of hydrogen between 100 sccm and 200 sccm, wherein the hydrogen is 25-75% of the flow, wherein infiltrating the first carbon nanotube and the second carbon nanotube with carbon causes the first carbon nanotube and the second carbon nanotube to have carbon deposits formed thereon and to not delaminate from a substrate during cooling subsequent the infiltrating; and
- a thin film extending along the first bottom surface and the second bottom surface, wherein the thin film is suspended between the first carbon nanotube and the second carbon nanotube.

2. The apparatus of claim 1, wherein the thin film comprises a carbon film.

3. The apparatus of claim 1, further comprising a sacrificial layer disposed between the thin film and both the first bottom surface of the first carbon nanotube and the second bottom surface of the second carbon nanotube, wherein the sacrificial layer comprises a thickness of 1-1000 microns.

4. The apparatus of claim 1, wherein the first carbon nanotube and the second carbon nanotube are further infiltrated with an additional material other than carbon by chemical vapor deposition, and the thin film comprises a silicon dioxide film, an aluminum oxide film, or a boron carbide film.

5. The apparatus of claim 1, further comprising a yield tensile strength of 110 megapascals (MPa) and a Young's modulus of 6 gigapascals (GPa).

6. The apparatus of claim 1, wherein the thin film comprises carbon to increase resistance to bending of a transmission electron microscopy (TEM) grid.

7. A method, comprising:
growing a carbon nanotube (CNT) structure on a substrate, wherein the CNT structure comprises:
- a first CNT; and
- a second CNT, wherein the first CNT and the second CNT are vertically aligned, wherein, during growing the first CNT or the second CNT includes:
  - flowing the ethylene at approximately fifteen parts per minute; and
  - flowing the hydrogen at approximately forty parts per minute; and
infiltrating bulk carbon between the first CNT and the second CNT, the bulk carbon adhering to the first CNT and the second CNT, wherein the infiltrating comprises heating the first CNT and the second CNT in the presence of a gas mixture to a temperature between approximately 800 to 950° C., wherein:
- the gas mixture comprises:
  - ethylene flowing at approximately one part per minute; and
  - hydrogen flowing at approximately two parts per minute;
- the gas mixture is flowed over the first CNT and the second CNT for an amount of time ranging from 1 minute to 24 hours; and
- the infiltrating strengthens the carbon nanotube structure such that when the carbon nanotubes are cooled, the carbon nanotubes do not delaminate from the substrate; and
cooling the first CNT and the second CNT in the presence of argon to approximately 300° C.

8. The method of claim 7, wherein growing the first CNT and the second CNT comprises:
growing the first CNT on a first iron catalyst site deposited on the substrate; and
growing the second CNT on a second iron catalyst site deposited on the substrate,
wherein the growing comprises:
heating the substrate to between 60° and 900° C.; and
flowing ethylene and hydrogen over the substrate for 10 minutes.

9. The method of claim 7, wherein:
the substrate comprises a silicon substrate; and
the silicon substrate is heated to 750° C.

10. The method of claim 7, further comprising removing the substrate via etching, wherein the etching is performed in 300 Watt oxygen plasma at 100 mTorr.

11. The method of claim 7, wherein the first CNT or the second CNT comprises a carbon density of approximately 1% of a volume of the first CNT or the second CNT.

12. The method of claim 7, comprising flowing 25 sccm of argon over the first CNT and the second CNT during the cooling.

13. The method of claim 7, further comprising burning out the first CNT and the second CNT in an oxygen-containing environment to remove the carbon deposited on the first CNT and the second CNT during the infiltration.

* * * * *